(12) United States Patent
Cha et al.

(10) Patent No.: US 9,140,954 B2
(45) Date of Patent: Sep. 22, 2015

(54) REFLECTIVE TYPE DISPLAY DEVICE

(71) Applicant: Samsung Electronics Co., Ltd., Gyeonggi-do (KR)

(72) Inventors: Kyung-Hoon Cha, Seoul (KR); Jong-In Lee, Gyeonggi-do (KR); Seong-Woon Kang, Gyeonggi-do (KR); Young-Woong Kim, Seoul (KR); Sung-Jin Park, Seoul (KR); Kyu-Suk Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/230,467

(22) Filed: Mar. 31, 2014

(65) Prior Publication Data

US 2014/0327955 A1 Nov. 6, 2014

(30) Foreign Application Priority Data

May 6, 2013 (KR) .................. 10-2013-0050520

(51) Int. Cl.
*G02B 26/00* (2006.01)
*G09G 3/34* (2006.01)
*G02F 1/167* (2006.01)
*G02B 26/02* (2006.01)

(52) U.S. Cl.
CPC .............. *G02F 1/167* (2013.01); *G02B 26/026* (2013.01); *G09G 3/344* (2013.01); *G02F 2001/1672* (2013.01); *G02F 2001/1676* (2013.01); *G02F 2001/1678* (2013.01); *G02F 2203/02* (2013.01)

(58) Field of Classification Search
CPC ... G02F 1/167; G02F 1/19; G02F 2001/1672; G02F 2001/1676; G02F 2001/1678; G09G 3/34; G09G 3/344; G09G 3/3446; G09G 3/3453; G09G 2300/0434; G02B 26/00
USPC .......... 359/295, 296, 452, 492; 345/107, 174; 349/86, 139, 140; 204/600; 428/469
See application file for complete search history.

(56) References Cited

U.S. PATENT DOCUMENTS

| | | | |
|---|---|---|---|
| 5,930,026 A | 7/1999 | Jacobson et al. | |
| 5,961,804 A | 10/1999 | Jacobson et al. | |
| 6,680,726 B2 * | 1/2004 | Gordon et al. | 345/107 |
| 6,727,873 B2 * | 4/2004 | Gordon et al. | 345/88 |
| 6,876,476 B1 * | 4/2005 | Miura et al. | 359/252 |
| 7,046,228 B2 * | 5/2006 | Liang et al. | 345/107 |
| 7,236,291 B2 * | 6/2007 | Kaga et al. | 359/296 |
| 7,492,505 B2 * | 2/2009 | Liang et al. | 359/296 |
| 7,656,576 B2 * | 2/2010 | Suwabe et al. | 359/296 |

(Continued)

FOREIGN PATENT DOCUMENTS

| | | |
|---|---|---|
| JP | 2005107246 | 4/2005 |
| JP | 2008233306 | 10/2008 |

*Primary Examiner* — Loha Ben
(74) *Attorney, Agent, or Firm* — The Farrell Law Firm, P.C.

(57) ABSTRACT

A reflective type display device is provided, and includes a drive layer that includes pigment particles containing at least two colors of pigments, and transparent electrodes provided on a top surface and a bottom surface of drive layer, respectively, so as to drive the pigment particles. The drive layer includes transparent particles provided among the pigment particles. In the reflective type display device, the pigment particles are arranged among the transparent particles that form the drive layer and a lighting device is disposed on the bottom surface of the drive layer. Thus, uniform lighting may be provided even in a dark environment regardless of the size of the display device.

16 Claims, 5 Drawing Sheets

(56) References Cited

U.S. PATENT DOCUMENTS 7,808,696 B2 * 10/2010 Lee et al. ............ 359/296
7,933,062 B2 * 4/2011 Masuzawa et al. ............ 359/296
2004/0008398 A1 1/2004 Amundson

* cited by examiner

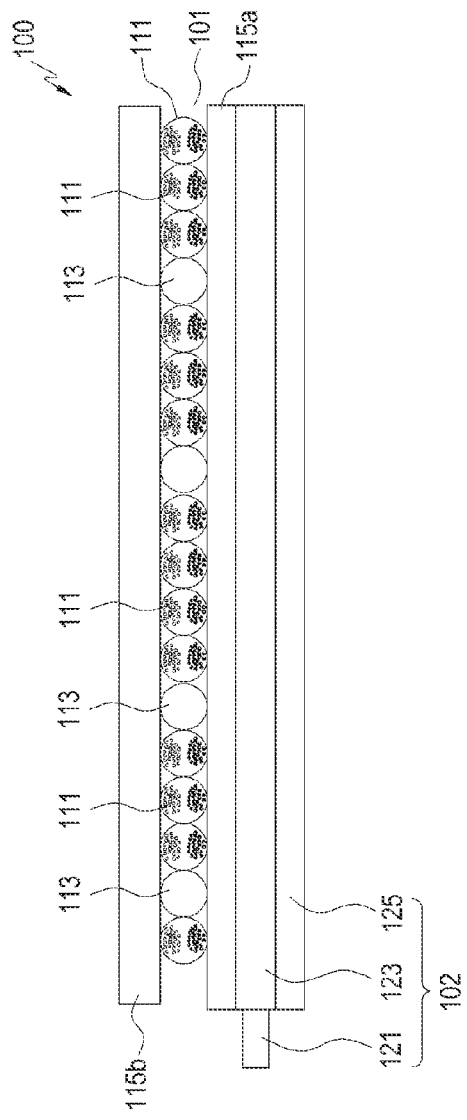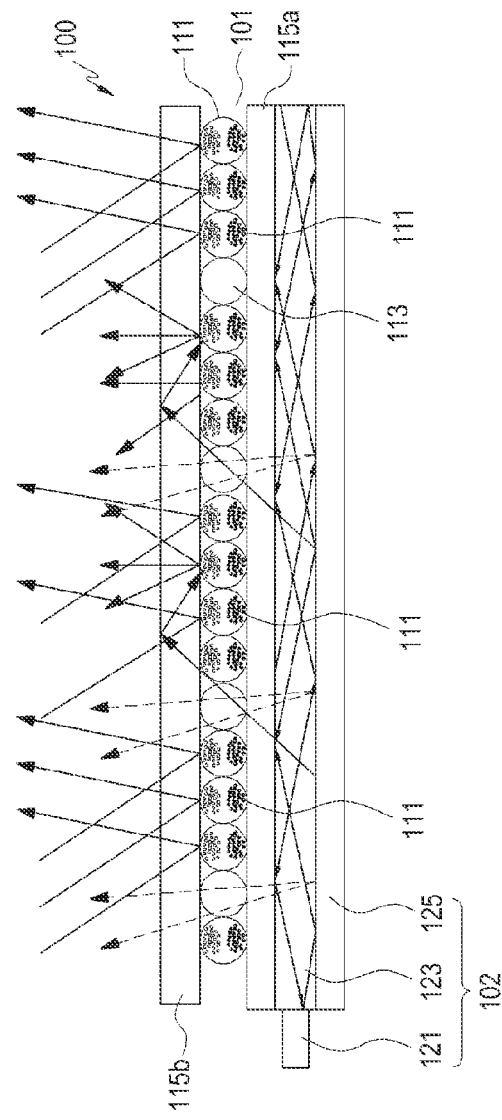

REFLECTIVE TYPE DISPLAY DEVICE

PRIORITY

This application claims priority under 35 U.S.C. §119(a) to Korean Application Serial No. 10-2013-0050520, which was filed in the Korean Intellectual Property Office on May 6, 2013, the entire content of which is incorporated herein by reference.

BACKGROUND

1. Field of the Invention

The present invention generally relates to a display device, and more particularly, to a reflective type display device of which a screen may be watched through lighting provided from an external environment.

2. Description of the Related Art

Reflective type display devices, commonly referred to as "electronic paper", are variously developed as a screen display element together with a Liquid Crystal Display (LCD), a plasma display panel, and an electro luminescence element. The reflective type display device includes a thin flexible film coated with pigment particles so as to display characters or images when the pigments are driven by an electric signal and easily secure flexibility while implementing a clear image quality as if an image is printed on an ordinary paper. A drive layer of the reflective type display device is made of pigment particles that contain pigments of at least two different colors in which transparent electrodes are arranged on the top surface and the bottom surface of the drive layer, respectively, so as to drive the pigment particles. In a reflective type display device that implements only a black and white screen, black and white pigments are introduced into the pigment particles, respectively.

In general, the reflective type display device allows the screen to be watched through lighting provided from an external environment. However, as the reflective type display device is mounted on a device that is used in an everyday environment like an electronic book terminal, the necessity of a separate lighting device has increased. In fact, a lighting device such as a compact light emitting diode equipped on an electronic book terminal has now appeared on an after-market. Typically, the drive layer made of pigment particles does not transmit light. Thus, when the display device is provided with a lighting device, the lighting device is arranged on the top surface of the drive layer.

FIG. 1 illustrates a structure in which a lighting device is provided in a conventional reflective type display device 10.

As described above, the display device 10 includes a drive layer 11 which is made of pigment particles 11a in which transparent electrodes 13b and 13a are disposed on the top surface and the bottom surface of the drive layer 11, respectively. At least one of the transparent electrodes 13a and 13b is an active element. For example, the transparent electrode provided on the bottom surface of the drive layer 11 may be made of a thin film transistor. The other of the transparent electrode may be configured as a passive element. For example, the transparent electrode provided on the top surface of the drive layer 11 may be made of an Indium Tin Oxide (ITO) film. The pigment particles 11a are driven in response to a signal applied to the transparent electrodes 13a and 13b such that black or white pigment 11b is oriented toward the top surface of the drive layer 11. Thus, the display device 10 outputs a screen.

As described above, the lighting device is disposed on the display device 10, specifically, on the top surface of the drive layer 11. The lighting device is provided with a light source 15a such as a light emitting diode and a light guide plate 15b. The light guide plate 15b may be attached to the transparent electrode 13b positioned on the top surface of the drive layer 11. In addition, the display device 10 is provided with a protection film 17 attached to the light guide plate 15b so as to prevent damage of the light guide plate 15b. This is because, when damage such as a scratch occurs on the light guide plate 15b which substantially forms a screen transmission region, image quality may be degraded. Light emitted from the light source 15a is diffused to a screen display region of the display device 10 through the light guide plate 15b and absorbed to or reflected by the pigment particles 11a of the drive layer 11, thereby allowing a screen implemented on the display device 10 to be watched even in a dark environment.

However, the lighting device has a disadvantage in that it is difficult for the lighting device to provide lighting evenly to the screen display region. In other words, at a point distant from a light source, the lighting at the point is lowered. Accordingly, when the lighting device is installed in the reflective type display device, there is a limit in fabricating the screen display region in a large size. In order to provide lighting evenly over the entire screen display region, a plurality of light sources may be arranged at regular intervals. However, this also causes an increase of manufacturing costs. Further, a reflection pattern may be formed on the light guide plate so as to provide lighting evenly over the screen display region. However, since the output screen passes through the light guide plate, the reflection pattern becomes the cause of degradation of image quality.

SUMMARY

The present invention has been made to address at least the problems and disadvantages discussed above, and to provide at least the advantages described below.

Accordingly, an aspect of the present invention provides a reflective type display device in which lighting is provided evenly over a screen display region;

Another aspect of the present invention provides a reflective type display device which minimizes an increase of manufacturing costs while providing lighting over the entire screen display region.

Another aspect of the present invention provides a reflective type display device which provides lighting while preventing degradation of image quality.

According to an aspect of the present invention, there is provided a reflective type display device including a drive layer that includes pigment particles containing at least two colors of pigments; and transparent electrodes provided on a top surface and a bottom surface of drive layer, respectively, so as to drive the pigment particles. The drive layer includes transparent particles provided among the pigment particles.

BRIEF DESCRIPTION OF THE DRAWINGS

The above and other aspects, features, and advantages of the present invention will be more apparent from the following detailed description taken in conjunction with the accompanying drawings, in which:

FIG. 3 is a view illustrating a reflective type display device which may be configured by pixels 115, one of which is illustrated in FIG. 2;

FIGS. 4 and 5 are views describing operations of the reflective type display device, respectively;

DETAILED DESCRIPTION OF EMBODIMENTS OF THE PRESENT INVENTION

Hereinafter, various embodiments of the present invention will be described with reference to the accompanying drawings. For purposes of clarity and simplicity, a detailed description of known functions and configurations incorporated herein will be omitted as it may make the subject matter of the present disclosure unclear.

As illustrated in FIGS. 2 to 9, reflective type display devices according to various embodiments of the present invention include transparent particles which are distributed between pigment particles that form a drive layer. The transparent particles are formed by introducing a gas, a liquid or a solid that transmits light to transparent capsules or well structures. Unlike a drive layer of a conventional reflective type display device which does not transmit light, the reflective type display devices according to various embodiments of the present invention may be provided with lighting devices on the rear surfaces thereof since transparent particles are distributed in the drive layers thereof. In other words, light from a lighting device installed on the rear surface of a reflective type display device may pass through the transparent particles to be diffused over the entire front surface of the drive layer of the reflective type display device.

Figure 1:
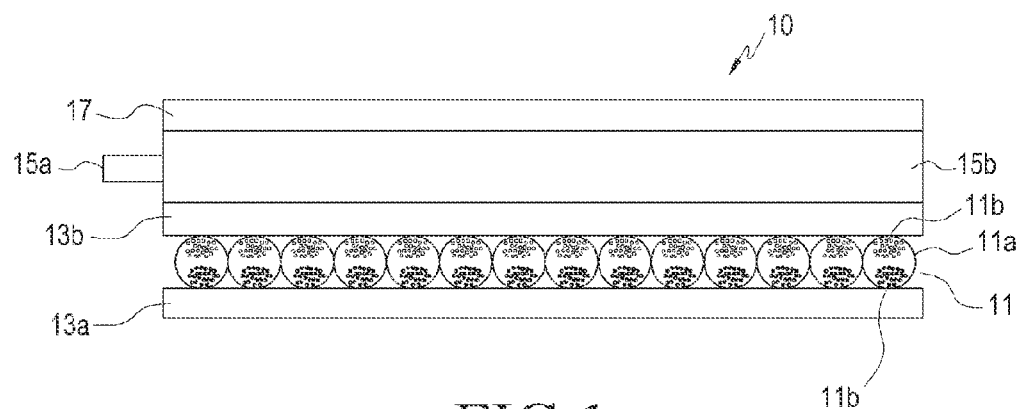
FIG. 1 is a view illustrating a structure in which a lighting device is provided in a conventional reflective type display device.
Figure 2:
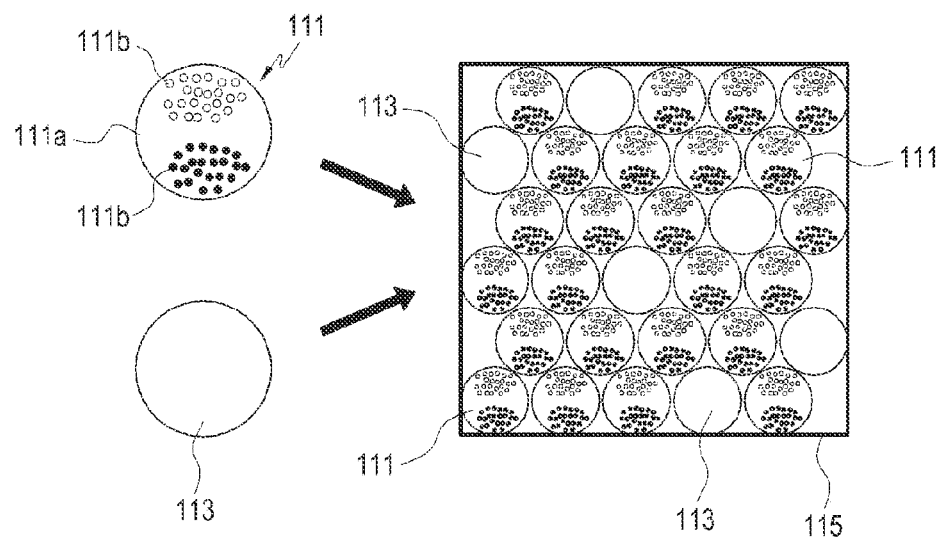
FIG. 2 is a view describing a structure of a pixel of a reflective type display device according to an embodiment of the present invention.

FIG. 2 is a view describing a structure of a pixel 115 of a reflective type display device according to an embodiment of the present disclosure, and FIG. 3 illustrates a reflective type display device 100 which may be configured by pixels 115, one of which is illustrated in FIG. 2. As illustrated in FIG. 2, the pixel 115 is made of a plurality of pigment particles 111 and transparent particles 113. Each pixel 115 has a length and a width of about 170 micrometers. Each pigment particle 111 is formed by introducing pigments 111b having at least two colors into a transparent capsule 111a. For example, when it is desired to implement a black and white screen using the display device 100, the pigment particle 111 will contain black and white pigments in the capsule 111a. When it is desired to implement a color screen using the display device 100, the pigment particle 111 will contain red, green, and blue pigments in the capsule 111a. Each transparent particle 113 is configured by a transparent capsule and may be filled with a gas, a liquid or a solid that transmits light.

When arranging the transparent particles 113 within one pixel 115 and further within the entire screen display region of the display device 100, the transparent particles 113, of which the number is less than or equal to the number of pigment particles 111, are mixed with the pigment particles 111. In addition, when arranging the transparent particles 113 among the pigment particles 111, the transparent particles 113 may be arranged regularly or irregularly. When configuring the display device 100, the display device 100 shall be properly designed in consideration of, for example, the number and arrangement of the transparent particles 113, screen resolution, and lighting luminance. Meanwhile, each or the pigment particles 111 or the transparent particles 113 may be formed in a spherical shape or a polyhedral shape. The shapes of the particles may also be properly selected in the process of designing the drive layer 101.

Referring to FIG. 3, the display device 100 has a structure in which the drive layer 101 made of the pigment particles 111 and the transparent particles 113 is arranged between transparent electrodes 115a and 115b which face each other. At least one of the transparent electrodes 115a and 115b is configured as an active element, and in an embodiment of the present invention, the transparent electrodes 115a and 115b may be configured by a combination of active elements and passive elements. An active element, which may be used for the transparent electrodes 115a and 115b, comprises a Thin Film Transistor (TFT). A passive element comprises an Indium Tin Oxide (ITO) film. Each of the transparent electrodes 115a and 115b may be configured by a flexible printed circuit board. In this case, the display device 100 may be deformed in any direction. In other words, the display device 100 may be implemented as a flexible display device.

The display device 100 includes a lighting device 102 provided on the bottom surface of the drive layer 101, in other words on the rear surface which is opposite to the front surface where the screen is displayed. The lighting device 102 includes a light source 121 and a light guide plate 123. As the light source 121, a point light source or a line light source may be used, and the light emitted from the light source 121 is incident on the light guide plate 123 and is diffused over the screen display region of the display device 100. Considering, for example, lifespan and efficiency, a light emitting diode may be used as the light source 121.

In order to cause the light emitted from the light source 121 to progress in a screen display direction, the lighting device 102 is provided with a reflection plate 125. The reflection plate 125 is attached to the bottom surface of the light guide plate 123 to reflect the light diffused through the light guide plate 123 back toward the drive layer 101. The reflection plate 125 may be replaced by a reflection pattern formed on the surface of the light guide plate 123. Using the structure of the reflection plate 125 or the distribution of the reflection pattern, a region adjacent to the light source 121 may be made to reflect a relatively small amount of light toward the drive layer 101, and a region distant from the light source 121 may be made to reflect a large amount of light toward the drive layer 101. That is, with the arrangement of the reflection plate 125 or the reflection pattern, uniform lighting is provided over the entire screen display region. As a result, the display device 100 provides lighting while maintaining the image quality of the screen implemented by the drive layer 101 so that the display device 100 may be used even in a dark environment. In addition, since the uniform lighting may be provided over the entire screen display region using the reflection plate 125 or the reflection pattern, the reflective type display device may be easily incorporated in a device that requires a larger screen.

Figure 5:
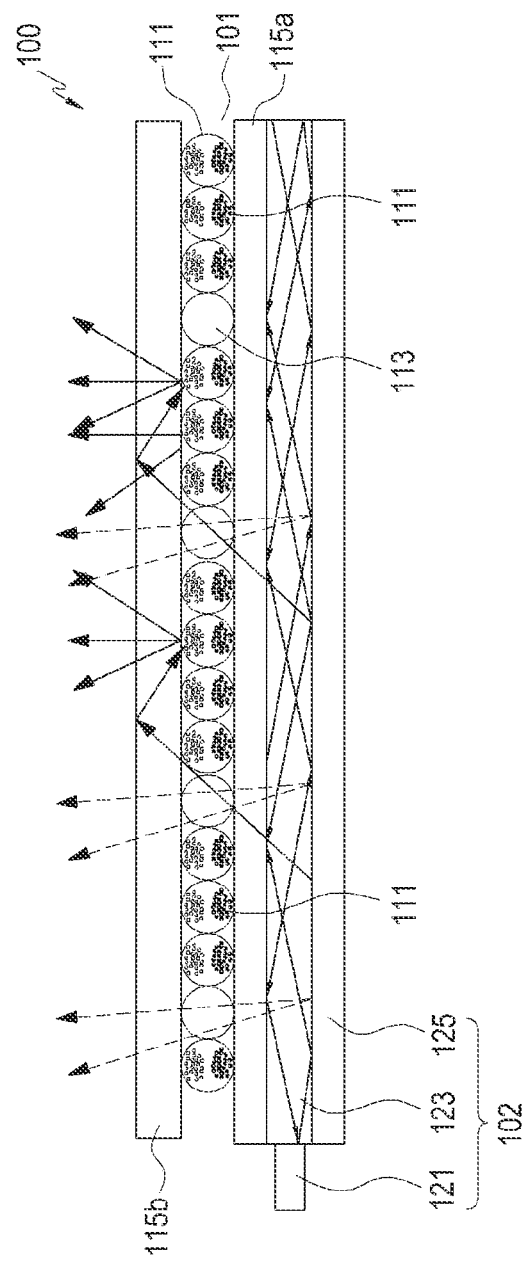

FIGS. 4 and 5 are views describing operations of the display device 100, respectively.

As described above, the reflective type display device has a structure that allows the screen to be watched through light from the external environment. FIG. 4 illustrates a state where the display device 100 is operated when it is provided with light from the external environment. Upon being provided with the light from the external environment, a user may view the screen implemented through the display device 100. Specifically, when the pigment particles 111 are driven, the screen is implemented. At this time, when the white pigments are positioned at the upper portion of the drive layer 101, light is reflected, and when the black pigments are positioned at the upper portion of the drive layer 101, light is absorbed. As a result, the user may view a screen implemented with black and white colors. Meanwhile, as described above, for a color screen, the pigment particles 111 contain red, green and blue pigments. In this case, the screen may be implemented with various colors.

When sufficient light is provided from the external environment, the lighting device 102 does not have to be necessarily operated. However, when the light provided from the outside is not sufficient, the lighting device 102 is operated so as to provide lighting. When the lighting device 102 is operated, as shown in FIG. 5, the light emitted from the light source 121 is diffused over the screen display region through the light guide plate 123. When the light diffused through the light guide plate 123 is reflected by the reflection plate 125 or the reflection pattern, the light is discharged upwardly through the transparent particles 113 to the top side of the display device 100. At this time, a part of the discharged light is reflected again by the transparent electrode 115*b* on the top surface of the drive layer 101 to be incident on the pigment particles 111. As a result, even if sufficient light is not provided from the external environment, the user may view the screen output by the display device 100.

Figure 6:
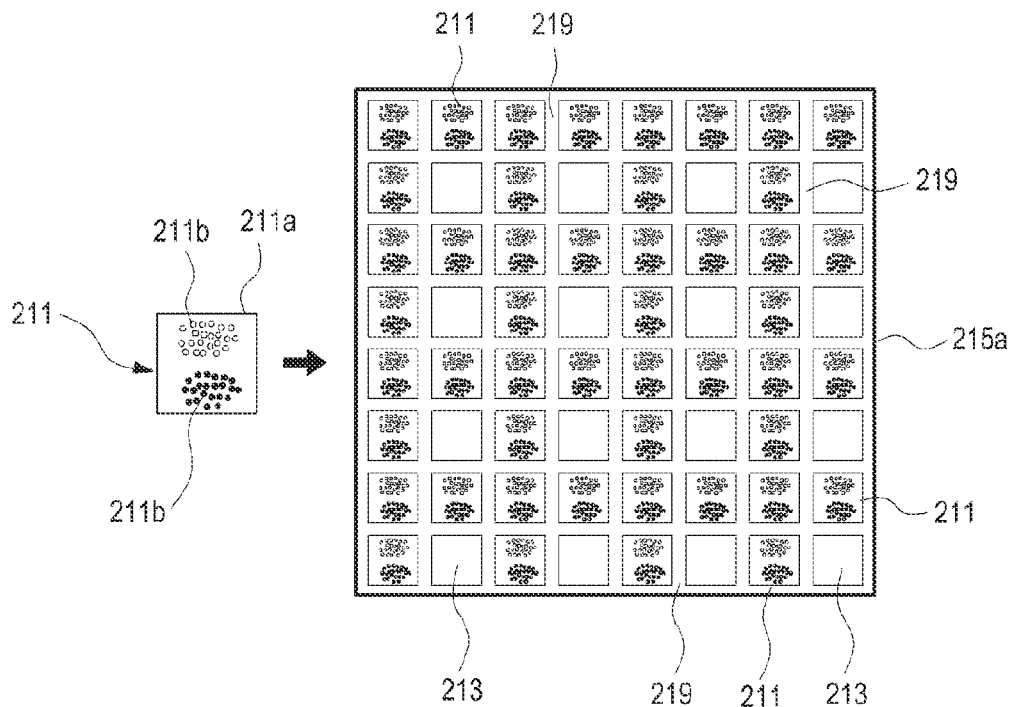
FIG. 6 is a view describing a pixel structure of a reflective type display device according to another embodiment of the present invention.
Figure 7:
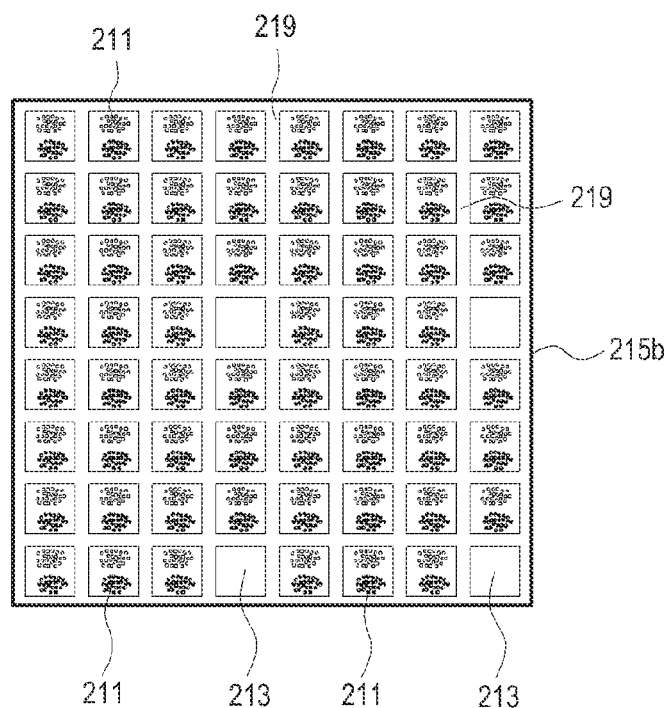
FIG. 7 is a view describing a modified embodiment of the pixel structure illustrated in FIG. 6.

FIG. 6 is a view describing a pixel structure of a reflective type display device according to another embodiment of the present invention, and FIG. 7 is a view describing a modified embodiment of the pixel structure illustrated in FIG. 6. As illustrated in FIGS. 6 and 7, pixels 215*a* and 215*b* according to various embodiments of the present invention may be provided with pixel structures configured not only by capsule-type pigment particles but also by well structure-type pigment particles 211, and further by a drive layer.

Each of the pixels 215*a* and 215*b* is configured by a well 211*a* divided by a plurality of partition walls 219 in which the partition walls 219 are arranged to intersect each other on a transparent barrier. Some of the wells 211*a* are introduced with different colors of pigments 211*b* to form pigment particles 211, and the remaining wells are respectively used as transparent particles 213. The transparent particles 213 may contain a gas, a liquid or a solid that transmits light as in the preceding embodiments. In the structures illustrated in FIGS. 6 to 9, each of the pigment particles 211 or transparent particles 213 is illustrated in a hexagonal shape. However, each of the pigment particles 211 may be formed in a polyhedral shape other than the hexagon shape or a spherical shape. FIG. 6 illustrates a pixel 215*a* in which one of every four wells 211*a* is set as a transparent particle 213, and FIG. 7 illustrates a pixel 215*b* in which one of every sixteen wells is set as a transparent particle 213. In arranging the transparent particles 213 among the pigment particles 211, the number, positions, etc. of the transparent particles 213 should be properly designed in consideration of the required lighting intensity, the resolution of the display device, etc.

Figure 8:
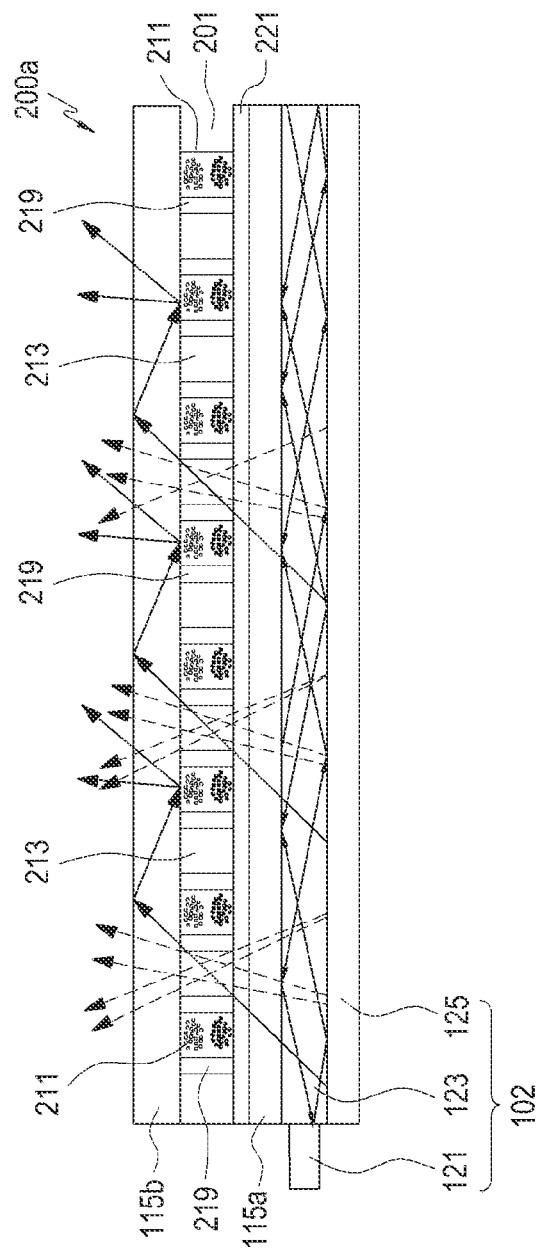
FIG. 8 is a view illustrating a reflective type display device to which the pixel structures, one of which is illustrated in FIG. 6, are applied.
Figure 9:
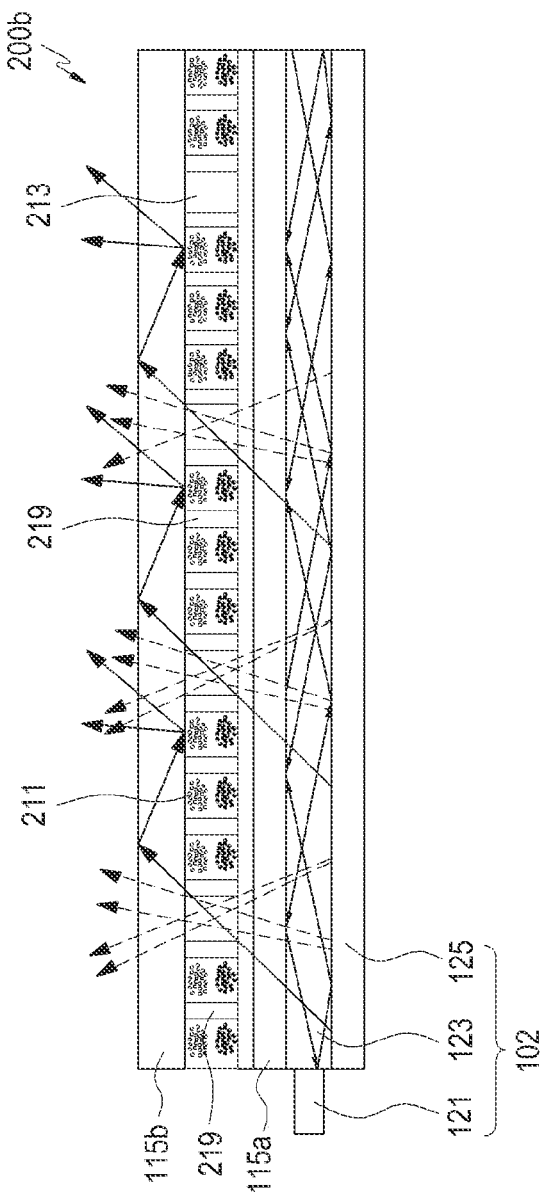
FIG. 9 is a view illustrating a reflective type display device to which the pixel structures, one of which is illustrated in FIG. 7, are applied.

FIG. 8 illustrates a reflective type display device 200*a* to which the pixel structures, one of which is illustrated in FIG. 6, are applied, and FIG. 9 illustrates a reflective type display device 200*b* to which the pixel structures, one of which is illustrated in FIG. 7, are applied, respectively. Each of the display devices 200*a* and 200*b* illustrated in FIGS. 8 and 9 is provided with a lighting device 102. The lighting device 102 is provided with a light source 121, a light guide plate 123, and a reflection plate 125 (or a reflection pattern). The structure and operations of the lighting device 102 of this embodiment of the present invention may be easily understood from the description of the preceding embodiments. It is noted that the reference numerals denoted in the lighting device 102 are the same as those used in the preceding embodiments.

When the light source 121 of the lighting device 102 is operated, emitted light is reflected by the reflection plate 125 (or the reflection pattern) while being diffused over the entire screen display region through the light guide plate 123. The reflected light passes through the transparent particles 213 such that a part of the reflected light is discharged in the screen display direction of the display device 200*a* or 200*b* and the other part is reflected by the transparent electrode 115*b* on the top surface of the drive layer 201 to be incident on the pigment particles 211. The pigment particles 211 absorb or reflect again the incident light and through this, the user may view the screen implemented by the display device 200*a* or 200*b*.

The reflective type display devices according to various embodiments of the present invention as described are configured in such a manner that transparent particles are arranged among pigment particles that form a drive layer and a lighting device is disposed on the bottom surface of the drive layer. Thus, the reflective type display devices may provide uniform lighting even in a dark environment regardless of the size of the display device. In addition, a light guide plate is disposed on the bottom surface of the drive layer and a reflection pattern or a reflection plate is disposed on the bottom surface of the light guide plate. Thus, lighting may be evenly provided over the entire screen display region while preventing degradation of image quality. Further, even in a device in which the screen display region is further enlarged, uniform lighting may be provided using a reflection, etc. without increasing the number of light sources. Accordingly, a lighting device may be installed in a reflective type display device while minimizing an increase of manufacturing costs.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A reflective type display device comprising:
a drive layer that includes pigment particles containing at least two colors of pigments; and
transparent electrodes provided on a top surface and a bottom surface of drive layer, respectively, so as to drive the pigment particles,
wherein the drive layer includes transparent particles provided among the pigment particles.

2. The reflective type display device of claim 1, further comprising a lighting device provided on the bottom surface of the drive layer,
wherein light emitted from the lighting device passes through the transparent particles so as to provide lighting.

3. The reflective type display device of claim 2, wherein the lighting device includes a light guide plate which is formed with a reflection pattern on a surface thereof, and a light source that provides light incident on the light guide plate, and
wherein light reflected by the reflection pattern passes through the transparent particles.

4. The reflective type display device of claim 2, wherein the lighting device includes a light guide plate, a reflection plate provided on a bottom surface of the light guide plate, and a light source that provides light incident on the light guide plate, and wherein light reflected by the reflection plate passes through the transparent particles.

5. The reflective type display device of claim 1, wherein the pigment particles are configured by transparent capsules and pigments introduced into the capsules.

6. The reflective type display device of claim 5, wherein the capsules have a spherical shape or a polyhedral shape.

7. The reflective type display device of claim 5, further comprising a lighting device provided on a bottom surface of the drive layer, wherein light emitted from the lighting device passes through the transparent particles to provide lighting.

8. The reflective type display device of claim 7, wherein the lighting device includes a light guide plate that is formed with a reflection pattern on a surface thereof, and a light source that provides light incident on the light guide plate, and wherein light reflected by the reflection pattern passes through the transparent particles.

9. The reflective type display device of claim 7, wherein the lighting device includes a light guide plate, a reflection plate provided on a bottom surface of the light guide plate, and a light source that provides light incident on the light guide plate, and wherein light reflected by the reflection plate passes through the transparent particles.

10. The reflective type display device of claim 1, wherein the drive layer includes wells divided by a plurality of partition walls that intersect each other, and wherein the pigment particles are configured by the wells and pigments introduced into the wells.

11. The reflective type display device of claim 10, wherein some of the wells form the transparent particles.

12. The reflective type display device of claim 10, wherein the pigment particles have a circular, hexagonal, or polyhedral shape.

13. The reflective type display device of claim 10, further comprising a lighting device provided on the bottom surface of the drive layer, wherein light emitted from the lighting device passes through the transparent particles to provide lighting.

14. The reflective type display device of claim 13, wherein the lighting device includes a light guide plate that is formed with a reflection pattern on a surface thereof, and a light source that provides light incident on the light guide plate, and wherein light reflected by the reflection pattern passes through the transparent particles.

15. The reflective type display device of claim 13, wherein the lighting device includes a light guide plate, a reflection plate provided on a bottom surface of the light guide plate, and a light source provides light that is incident on the light guide plate, and wherein light reflected by the reflection plate passes through the transparent particles.

16. The reflective type display device of claim 1, wherein each of the transparent electrodes is configured by a flexible printed circuit board.

* * * * *